United States Patent
Salot et al.

(10) Patent No.: US 9,055,520 B2
(45) Date of Patent: Jun. 9, 2015

(54) SYSTEMS, METHODS AND MEDIA FOR MOBILE MANAGEMENT ENTITY (MME) SELECTION BY EVOLVED NODE B (ENODEB)

(71) Applicant: Cisco Technology, Inc., San Jose, CA (US)

(72) Inventors: Nirav Salot, Pune (IN); Aeneas Dodd-Noble, Andover, MA (US); Ravi Guntupalli, Johns Creek, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 49 days.

(21) Appl. No.: 13/720,134

(22) Filed: Dec. 19, 2012

(65) Prior Publication Data

US 2014/0169269 A1  Jun. 19, 2014

(51) Int. Cl.
| | |
|---|---|
| *H04W 4/00* | (2009.01) |
| *H04W 48/20* | (2009.01) |
| *H04W 8/06* | (2009.01) |
| *H04W 76/02* | (2009.01) |
| *H04W 92/14* | (2009.01) |

(52) U.S. Cl.
CPC .............. *H04W 48/20* (2013.01); *H04W 8/065* (2013.01); *H04W 76/02* (2013.01); *H04W 92/14* (2013.01)

(58) Field of Classification Search
CPC ................................ H04W 4/00; H04W 60/00
USPC .......................... 370/328–339, 352, 252–253
See application file for complete search history.

(56) References Cited

U.S. PATENT DOCUMENTS

| | | | |
|---|---|---|---|
| 2009/0318161 A1 | 12/2009 | Lopes | |
| 2010/0061301 A1* | 3/2010 | Antal et al. | 370/328 |
| 2010/0271979 A1 | 10/2010 | Godin | |
| 2010/0291943 A1* | 11/2010 | Mihaly et al. | 455/450 |
| 2011/0014912 A1* | 1/2011 | Ahluwalia et al. | 455/435.1 |
| 2012/0302196 A1 | 11/2012 | Chin et al. | |

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 10)," 3GPP TS, vol. 36.413, No. V10.5.0, 7 pages. (Mar. 2012).

European Search Report issued by the European Patent Office for Application No. 13198578.0 mailed on Apr. 28, 2014 (9 pages).

* cited by examiner

*Primary Examiner* — Iqbal Zaidi
(74) *Attorney, Agent, or Firm* — Patent Capital Group

(57) ABSTRACT

A method for mobile management entity (MME) selection includes receiving at a base transceiver station (BTS) a message from each of multiple MMEs including information for advertising functionalities of each of the MMEs. The functionalities include at least one type of communications session supported by each of the MMEs. The method also includes receiving at the BTS a message from a user equipment (UE) to request for a communications session. The request message includes session type information indicating a type of session requested by the UE. At least one of the MMEs is capable of serving the requested type of session. The method further includes generating a list of candidate MMEs capable of serving the requested type of communications session from the MMEs by matching the session type information with the capability information, and selecting a serving MME from the list based on the information relating to the advertised functionalities.

22 Claims, 9 Drawing Sheets

SYSTEMS, METHODS AND MEDIA FOR MOBILE MANAGEMENT ENTITY (MME) SELECTION BY EVOLVED NODE B (ENODEB)

FIELD OF THE DISCLOSURE

This disclosure relates generally to systems, methods and media for selecting a mobile management entity (MME) at, for example, an Evolved Node B (eNodeB) based on the capability of MMEs to support various types of communications sessions.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many user equipment, including, for example, satellite communications systems, portable digital assistants (PDAs), laptop computers, and mobile devices (e.g., cellular telephones). One benefit that users of such devices can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

DESCRIPTION OF EXAMPLE EMBODIMENTS

Overview

Figure 1:
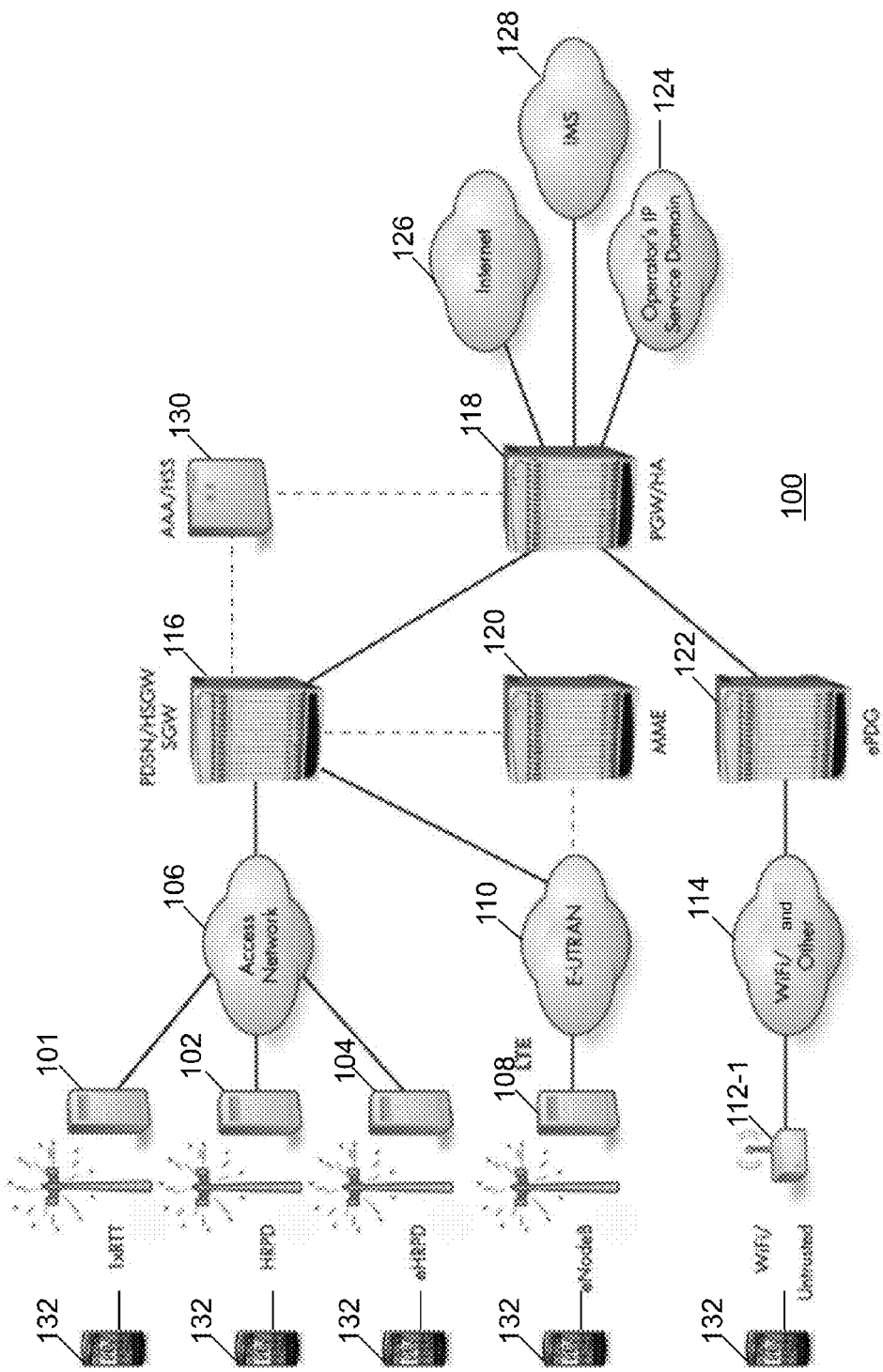
FIGS. 1-2 illustrate a communication network including a long term evolution (LTE) topology in accordance with certain embodiments.

Certain embodiments disclose a method that includes receiving at a base transceiver station (BTS) a message from each of a plurality of mobile management entities (MMEs), wherein each of the messages includes capability information for advertising functionalities that each of the plurality of MMEs is capable of providing and wherein the advertised functionalities include at least one type of communications session that is supported by each of the plurality of MMEs. The method also includes receiving at the BTS a message from a user equipment (UE) to request for a communications session, wherein the request message includes session type information indicating a type of communications session requested by the UE for services. At least one of the plurality of the MMEs is capable of serving the requested type of communications session. The method further includes generating at the BTS a list of candidate mobility management entities (MMEs) that are capable of serving the requested type of communications session for the services from the plurality of MMEs by matching the session type information with the information regarding the advertised functionalities, and selecting at the BTS a serving mobility management entity (MME) from the list of candidate MMEs based at least in part on the information relating to the advertised functionalities. In some embodiments, a computer program product residing on a non-transitory computer-readable medium is provided, wherein the computer program product includes computer executable code which, when executed by one or more processors, causes the one or more processors to perform the method described above.

Certain embodiments disclose a network device that includes a memory capable of storing data; and a processor configured for using the data such that the network device can receive a message from each of a plurality of mobile management entities (MMEs), wherein each of the messages includes capability information for advertising functionalities that each of the plurality of MMEs is capable of providing and wherein the advertised functionalities include at least one type of communications session that is supported by each of the plurality of MMEs. The network device is also configured for using the data such that the network device can receive a message from a user equipment (UE) for a communications session, wherein the request message includes session type information indicating a type of communications session requested by the UE for services. At least one of the plurality of the MMEs is capable of serving the requested type of communications session. The network device is further configured for using the data such that the network device can generate a list of candidate mobility management entities (MMEs) that are capable of serving the requested type of communications session for the services from the plurality of MMEs by matching the session type information with the information regarding the advertised functionalities, and select a serving mobility management entity (MME) from the list of candidate MMEs based at least in part on the information relating to the advertised functionalities.

Example Embodiments

The disclosed systems, methods and media illustrate mechanisms for selecting a mobility management entity (MME) from a pool of MMEs based on the features and functionalities supported by the MMEs and the types of a communication session that is desired by the requesting user equipment in addition to the load factors of the MMEs. In particular, the Evolved Node B (eNodeB) gathers the features/functionalities of the MMEs that are advertised and matches the features/functionalities of the MMEs with the types of the requested communication session to generate a list of candidate MMEs that are capable of serving the requesting user equipment.

FIG. 1 illustrates a communication system 100 with parallel networks in accordance with certain embodiments. FIG. 1 includes a number of radio access technologies such as a 1xRTT transceiver 101, a high-rate packet data (HRPD) transceiver 102, and an evolved high-rate packet data (eHRPD) transceiver 104, each of which can connect to an access network 106. An Evolved Node B (eNodeB) transceiver 108 is an LTE network radio network component that connects to an Evolved UMTS Terrestrial Radio Access Network (E-UTRAN) 110. Other radio access technologies such as Wireless Local Area Network (i.e., Wi-Fi), WiMAX, or any other radio spectrum technology 114, can use a transceiver shown generally at 112-1 to connect a user equipment (UE) 132 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the WLAN/other transceiver 112-1. On the packet core side, the anchor gateway can communicate with the operator's IP service domain 124, the Internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a UE. Even when the UE 132 is detached from the network, the HSS 130 maintains the binding information until the UE 132 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or chassis as described below.

The SGW 116 sits in the user plane where it forwards and routes packets to and from the eNodeB 108 and PGW 118. The SGW 116 also serves as the local mobility anchor for inter-eNodeB handover and mobility between 3GPP networks. The SGW 116 routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW 118). For idle state UEs 132, the SGW 116 terminates the down link data path and triggers paging when down link data arrives for the UE 132. The SGW 116 manages and stores UE contexts, e.g. parameters of the IP bearer service and network internal routing information. The SGW 116 also performs replication of the user traffic in case of lawful interception.

The PGW 118 acts as the interface between the LTE network and other packet data networks, such as the Internet 126 or SIP-based IMS networks 128 (fixed and mobile). The PGW 118 serves as the anchor point for intra-3GPP network mobility, as well as mobility between 3GPP and non-3GPP networks. The PGW 118 acts as the Policy and Charging Enforcement Function (PCEF), which manages Quality of Service (QoS), online/offline flow-based charging data generation, deep-packet inspection, and lawful intercept. The PGW 118 provides connectivity to the UE 132 to external packet data networks by being the point of exit and entry of traffic for the UE 132. A UE may have simultaneous connectivity with more than one PGW for accessing multiple packet data networks. The PGW 118 performs policy enforcement, packet filtering for each user, charging support, lawful interception, and packet screening. The PGW 118 also provides an anchor for mobility between 3GPP and non-3GPP technologies such as WiMAX and 3GPP2 standards (CDMA 1x and EVDO).

The MME 120 resides in the Evolved Packet Core (EPC) control plane and manages session states, authentication, paging, mobility with 3GPP 2G/3G nodes, roaming, and other bearer management functions. The MME 120 can be a standalone element or integrated with other EPC elements, including the SGW 116, PGW 118, and Release 8 Serving GPRS Support Node (SGSN). The MME 120 can also be integrated with 2G/3G elements, such as the SGSN and GGSN. This integration is the key to mobility and session management interworking between 2G/3G and 4G mobile networks.

The MME 120 is a control-node for the LTE access network. The MME 120 is responsible for UE tracking and paging procedures including retransmissions. The MME 120 handles the bearer activation/deactivation process and is also responsible for choosing the SGW 116 for a UE 132 at the initial attachment and at time of an intra-LTE handover as well as selecting an appropriate PGW (e.g., PGW 118). The MME 120 also authenticates the user by interacting with the HSS 130. The MME 120 also generates and allocates temporary identities to UEs 132 and terminates Network Access Server (NAS) signaling. The MME 120 checks the authorization of the UE 132 to camp on the service provider's Public Land Mobile Network (PLMN) and enforces UE roaming restrictions. The MME 120 is the termination point in the network for ciphering/integrity protection for NAS signaling and handles the security key management. Lawful interception of signaling is also supported by the MME 120. The MME 120 also provides the control plane function for mobility between LTE and 2G/3G access networks with the S3 interface terminating at the MME 120 from the SGSN (not shown). The MME 120 also terminates the S6a interface towards the home HSS 130 for roaming UEs 132.

Typically, the Evolved Node B (eNodeB) is statically configured with the Internet Protocol (IP) addresses of the S1 Application Part (S1AP) interface of one or more mobility management entities (MMEs). On power-up, the eNodeB establishes an S1AP connection to each configured MME's S1AP interface. For the selection of a particular MME during, e.g., International Mobile Subscriber Identity (IMSI)-based Initial Attach procedure, the eNodeB currently only considers the current load factor of the MMEs having an active S1AP connection—i.e., the current MME selection algorithm only takes into account the current load factor of the connected MMEs. The eNodeB simply assumes that all MMEs within an MME pool have the same capabilities/functionalities and thus does not allow selection of MMEs based on the service/communications session type requested by user equipment and the service/communications session type supported by the MMEs.

The ePDG 122 is responsible for interworking between the EPC and fixed untrusted non-3GPP access technologies such as a WLAN access networks. The ePDG 122 can use IPSec/IKEv2 to provide secure access to the EPC network. Optionally, the ePDG 122 can use Proxy Mobile IPv6 (PMIPv6) to interact with the PGW 118 when the mobile subscriber is roaming in an untrusted non-3GPP system. The ePDG 122 is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
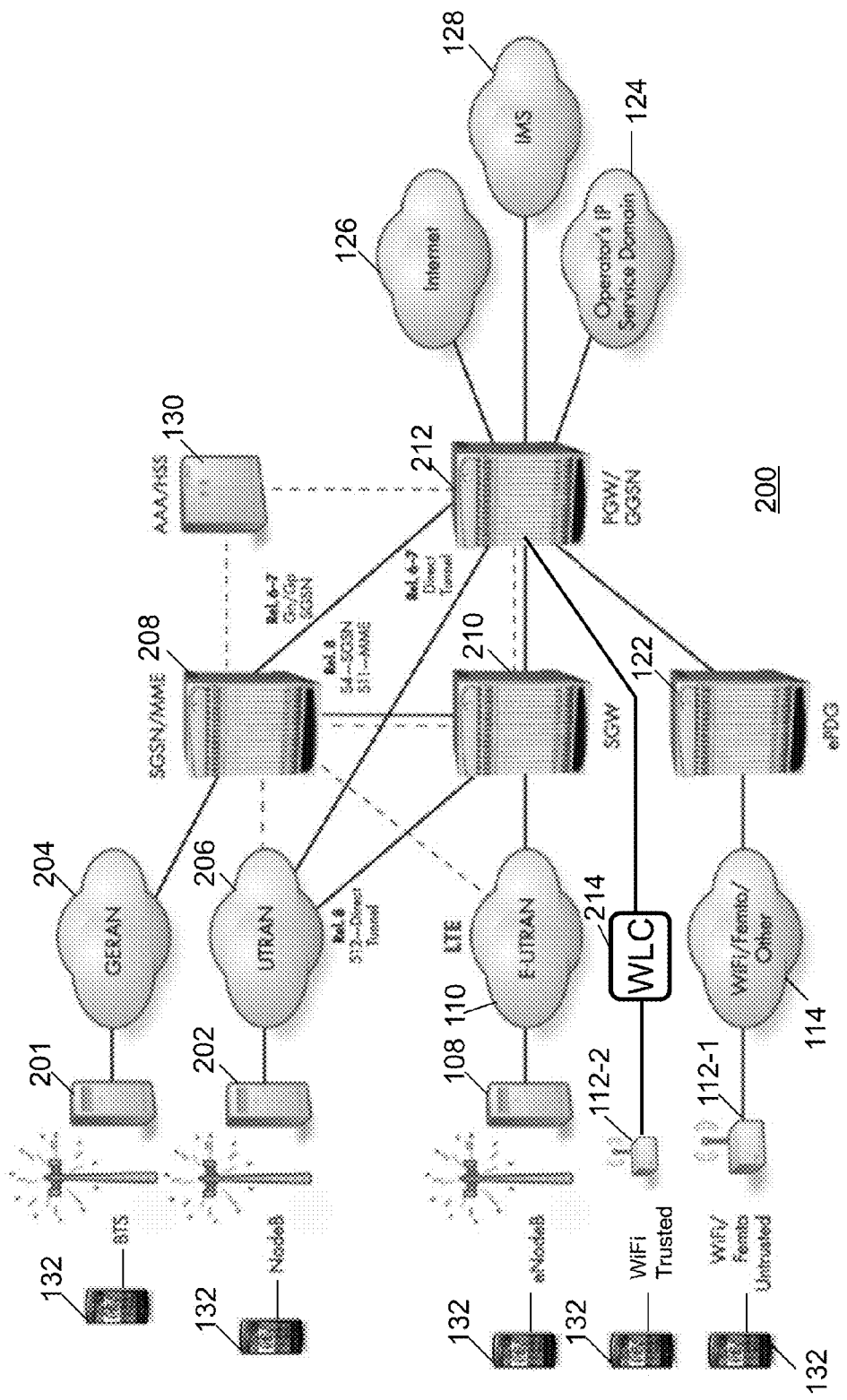

FIG. 2 illustrates a communication system 200 with parallel networks in accordance with legacy universal mobile telecommunications systems (UMTS) network devices in accordance with certain embodiments. The legacy transceivers include base transceiver station (BTS) 201 and NodeB transceiver 202. The BTS 201 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 210 or gateway GPRS support node (GGSN)/PGW 212. UEs 132 can receive data service via a trusted WLAN network. The trusted WLAN can include an access point (AP) 112-2 and a WLAN controller (WLC) 214.

In some embodiments, the efficient mechanism for balancing data load across parallel communication networks can be implemented on gateways, such as PGW/HA 118, PDSN/HSGW/SGW 116, SGSN/MME 208, PGW/GGSN 212, or SGW 210. The gateways can access and maintain information relating to the communication session, the subscriber, the radio bearers, and the policies relating to the communication session. The gateways may be used to provide various services to a UE 132 and implement the quality of service (QoS) on packet flows. Several of these functions are used in providing, for example, voice over IP (VoIP) routing and enhanced services, such as enhanced charging, stateful firewalls, and traffic performance optimization (TPO). The communication networks also allow provision of applications such as VoIP, streaming video, streaming music, multi-user gaming, location based services, and a variety of delivered to a mobile node. Residing within the gateways can be one or more network processing units, line cards, as well as packet and voice processing cards.

Figure 3:
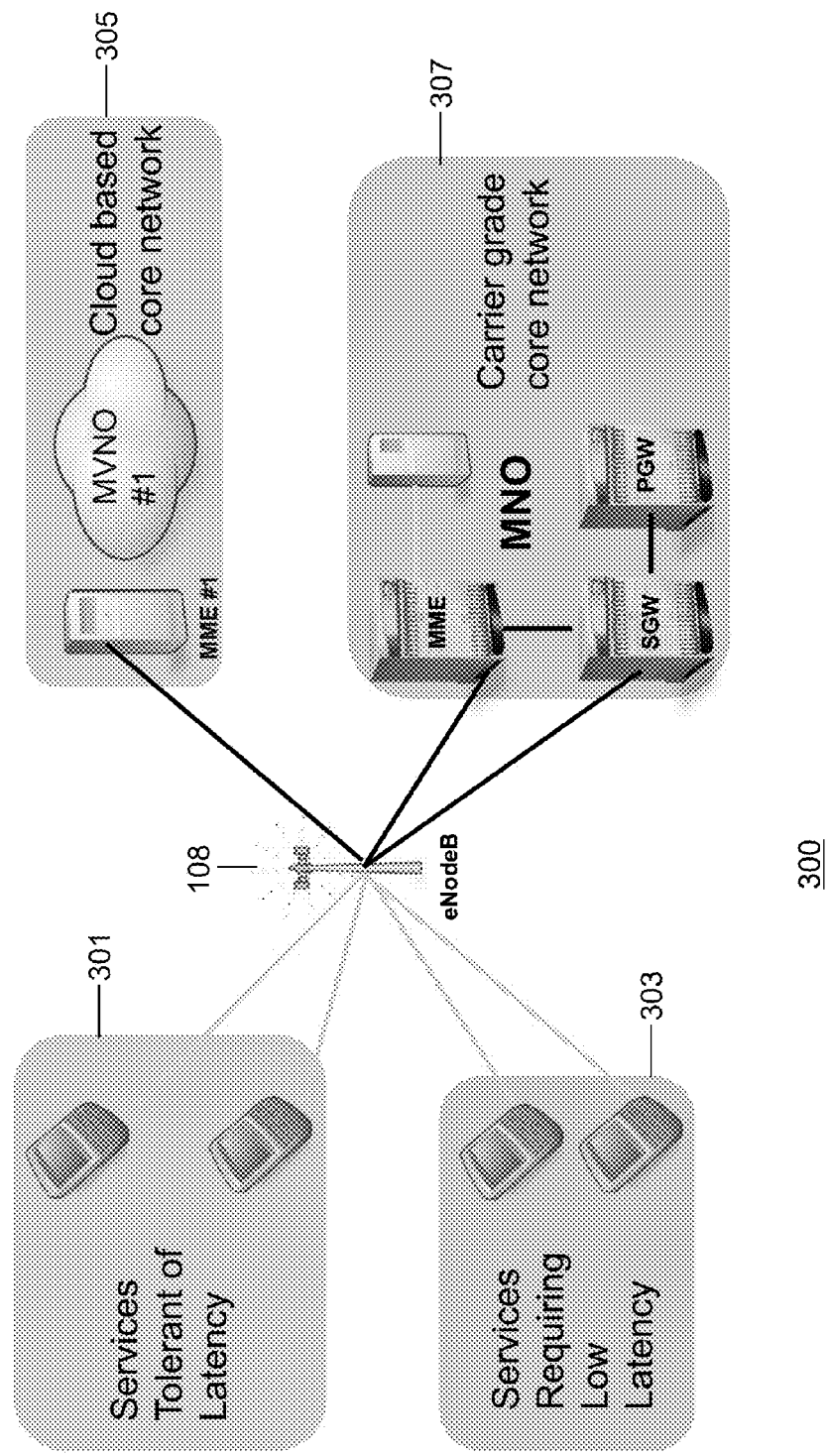
FIG. 3 shows a core network deployment model in accordance with certain embodiments.

FIG. 3 shows a core network deployment model 300 in accordance with certain embodiments. Mobile Network Operators (MNOs) provide to the subscribers different types of services, such as relatively low priority services 301 (e.g., services that can tolerate latency), relatively high priority services (e.g., services that require low latency) 303 and services that are provided to fulfill regulatory mandates. High priority services 303 mostly involve human subscribers running medium to low delay tolerant applications (e.g., IP Multimedia Subsystem (IMS) applications, including streaming video) and often demands or requires highly available, carrier grade core network 307 with low control and data path latency. Low priority service 301, on the other hand, mostly involves numerous machine type of subscribers (e.g., smart electricity/gas meters) running delay tolerant applications and often demands highly scalable network, such as a cloud-based core network 305.

Services provided to fulfill regulatory mandate, such as emergency services and public safety network services, also require highly available, carrier grade core network with very low control/data path latency. For example, the Third Generation Partnership Project (3GPP) has increased various features, such as support for emergency session, on top of basic Release 8 Architecture (3GPP Rel-8 Architecture; a.k.a., 4G LTE network architecture).

Mobile Network Operators (MNOs) look for ways to optimize the available network and computing resources. One type of core network does not fit for all types of services that may be provided by an MNO. Carrier grade core network 307, for example, provides highly available, low latency services and requires a commitment of a substantial amount of network and computing resources. As a result, carrier grade core network 307 would yield very low efficiency related to resource allocations if carrier grade core network 307 is selected, e.g., by eNodeB 108, to respond to requests for low priority services 301. Cloud-based core network 305 (e.g., Mobile Virtual Network Operator (MVNO)), on the other hand, provides highly scalable network and requires a gradual increase in allocations of the network and computing resources. As a result, user dissatisfactions would result if it is used to respond to requests for high priority services 303.

The term carrier-grade, as used in "carrier grade core network," refers to an ability to provide very high availability (e.g., 99.999%) and performance. A carrier grade core network, such as carrier grade core network 307, achieves such high availability by employing, e.g., carrier grade network elements (e.g., dedicated, fault-tolerant computing/processing resources with redundant components/parts) and carrier grade software applications (e.g., a combination of an industry proven software foundation, a robust middleware, and software programs configured for dedicated purposes). High performance may be achieved through optimized packet processing using, e.g., multicore software. The term, cloud-based, as used in "cloud-based core network," on the other hand, refers to an ability to access a collective power of numerous general computing resources that are not dedicated to any specific purposes/tasks. Though the computing devices and software resources of a carrier grade core network are dedicated to specific tasks (high availability, high performance), the capacity of the devices and resources cannot be readily expanded (limited scalability)—e.g., capacity expansion requires purchasing of hardware/software devices/tools, integration, testing, debugging, and increased maintenance.

The more loosely coupled, owned and/or operated computing devices and software resources of a cloud-based core network, on the other hand, are more numerous (better scalability) but they are often shared for many different purposes/tasks at a time (no guarantee of a level of availability or performance).

Figure 4:
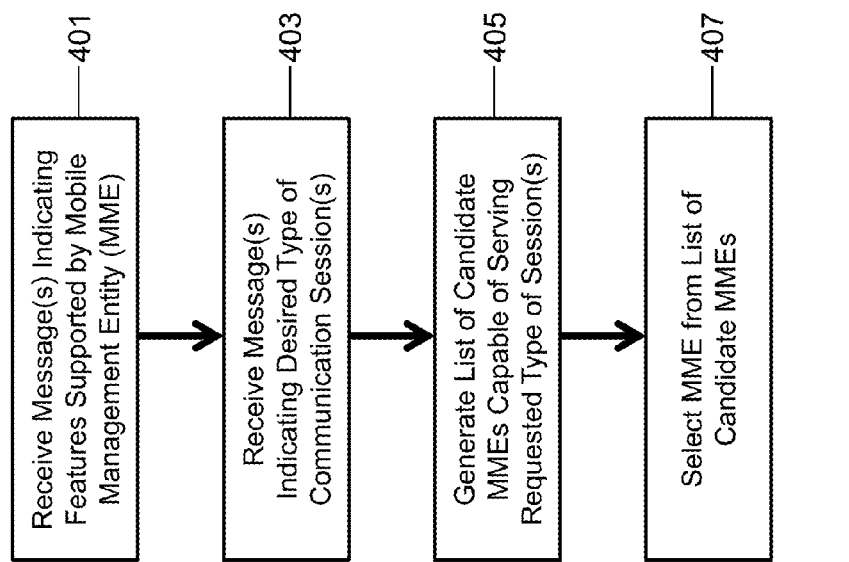
FIG. 4 shows a flow diagram for selecting a mobile management entity (MME) in accordance with certain embodiments.

FIG. 4 shows a flow diagram 400 for selecting a mobile management entity (MME) in accordance with certain embodiments. At 401, messages including capability information from one or more mobility management entities (MMES) are received. In some embodiments, the messages are received at an Evolved Node B (eNodeB), such as eNodeB 108. In some embodiments, a new S1 Application Part (S1AP) information element (IE), which is referred to as "MME Supporting Features," is used by the MMEs to indicate or advertise the capability of the MMEs to support various types of UE session. In some embodiments, the new IE contains a bitmap having an array of bits that correspond to communications session types supported by an MME. For example, a particular bit is set to 1 to indicate that the session type corresponding to the bit is supported by an MME. The new IE could be optionally included in one or more of messages supported by S1AP interface, such as "S1 Setup Response" and "MME Configuration Update." If the new IE is not provided by an MME, the receiving entity (e.g., eNodeB) assumes that the corresponding MME supports all types of UE sessions.

At 403, message(s) from a UE (e.g., UE 132) including information indicative of the type of communications session (session type information) that is desired by the UE, are received, e.g., at the eNodeB. In some embodiments, the session type information is included in the "Establishment Cause" in an "RRC Connection Request" message from the UE. The eNodeB can derive the session type information from the Establishment Cause of the RRC Connection Request and classify the requested UE session into, e.g., emergency session, high priority access session, delay tolerant session, etc. Table 1 shows a list of enumerated elements of the Establishment Cause. The list can be also found in 3GPP TS 36.331 Section 6.2.2.

TABLE 1

Elements of Establishment Cause of RRC Connection Request
Establishment Cause Elements emergency
highPriorityAccess
mt-Access (mobile termination-Access)
mo-Access (mobile originating-Access)
mo-Data (mobile originating-Data)
DelayTolerantAccess-v1020
spare 1
spare 2

At 405, a list of candidate MMEs that are capable of serving the desired type of communications session is generated, e.g., at the eNodeB. For example, the eNodeB can generate the list by matching the session type requested by the UE with the MME Supporting Features received from the MMEs. If the type of session requested by the UE is for low priority services, for instance, the eNodeB can generate a list of MMEs that can provide low priority services.

At 407, an MME is selected, e.g., by the eNodeB, from the list of candidate MMEs. In some embodiments, the eNodeB selects an MME from the list of candidate MMEs based on the current load factor of the candidate MMEs, e.g., to achieve an efficient load balancing. The ability to select an MME from a pool of MMEs based on the capabilities/functionalities supported by each MME allows a new flexibility for the mobile network operators (MNOs) to, e.g., upgrade one or more MMEs serving a same tracking area in a phased manner. For example, suppose there exists three MMEs (e.g., $MME_A$, $MME_B$ and $MME_C$) that serve a common tracking area. If $MME_A$ is upgraded first to support certain types of sessions, an MME serving the common tracking area will select only $MME_A$ when it receives a request for a service request requiring a setup of that type of session. If $MME_C$ is subsequently upgraded to support those sessions, the MME serving the common tracking area will select one of $MME_A$ and $MME_C$ that has a smaller workload to serve a request it has received that requires a setup of a session. In this case, after one MME was upgraded, the eNodeB could receive one set of information regarding its capabilities, and a different set of information from one or more other MMEs.

Figure 5:
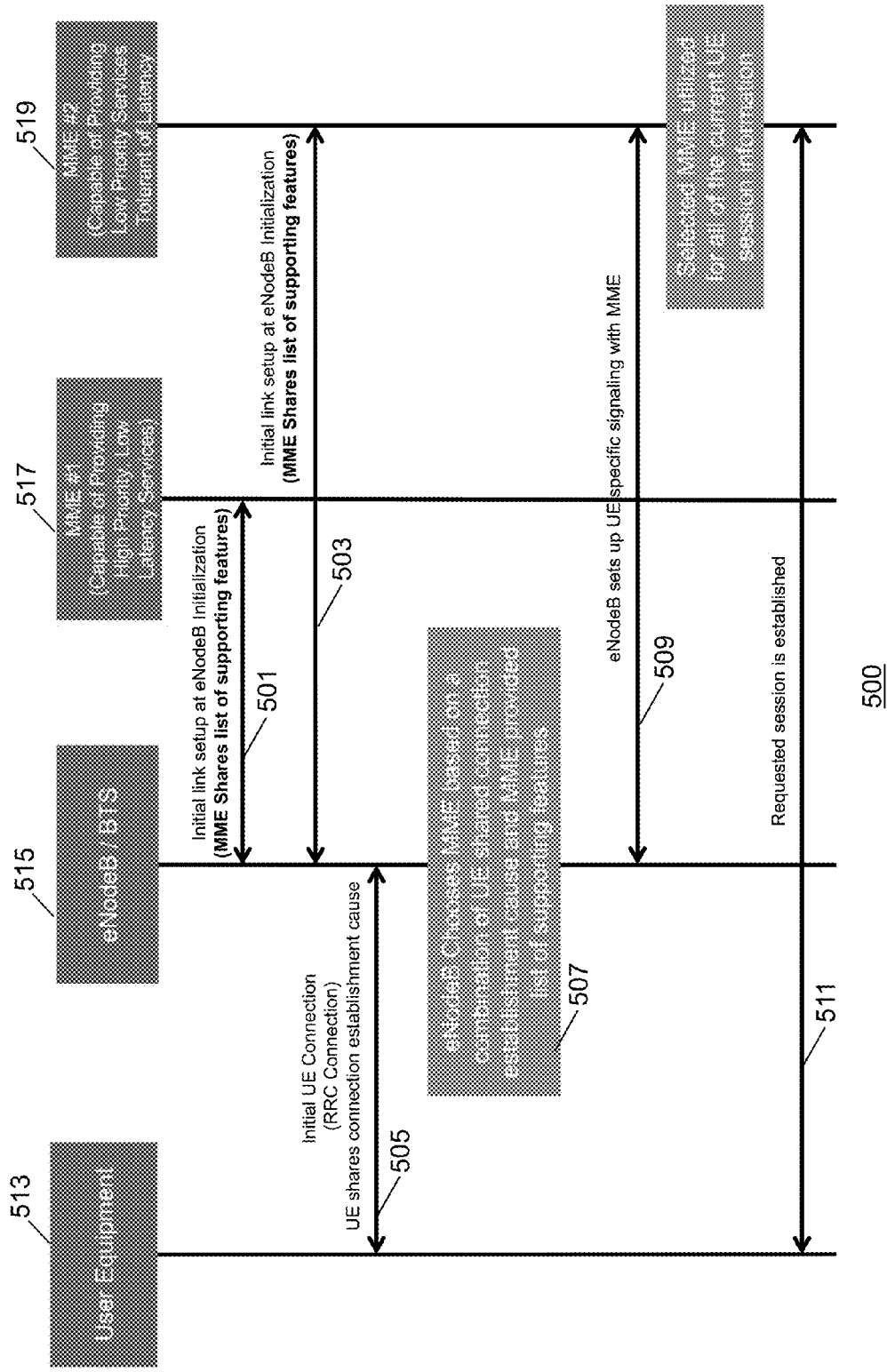
FIG. 5 shows a call flow diagram for selecting a mobile management entity (MME) in accordance with certain embodiments.

FIG. 5 shows a call flow diagram 500 for selecting a mobile management entity (MME) in accordance with certain embodiments. Referring to 501 and 503, connections are setup between an Evolved Node B (eNodeB) 515, or another type of base transceiver station (BTS), and one or more mobility management entities (MMEs), such as $MME_1$ 517 and $MME_2$ 519. In some embodiments, the eNodeB is statically configured with the IP addresses of the MMEs' S1AP interface such that upon power-up, the eNodeB can establish an S1AP connection to each configured MME's S1AP interface. In some embodiments, the MMEs advertise features/functionalities that each of the MMEs supports during or after the S1AP connection is established, e.g., by sending messages including a new S1AP information element (IE) called "MME Supporting Features."

Referring to 505, an initial connection is established between a user equipment (UE) 513 and eNodeB 515. UE 513, for example, can send to eNodeB 515 a message for requesting to set up a communications session that includes session type information. In some embodiments, UE 513 sends an RRC Connection Request message containing Establishment Cause that includes the session type information. Session type information indicates a type of communications session (e.g., an emergency session, a high priority access session, a delay tolerant session, etc.) that is desired/requested by UE 513.

Referring to 507, eNodeB 515 generates a list of one or more candidate MMEs that are capable of serving the type of communications session requested by UE 513. For example, eNodeB 515 can generate the list by matching the session type requested by the UE with the MME Supporting Features received from the MMEs. If, for instance, the type of session requested by UE 513 is for low priority services, only $MME_2$ 519 (MME for low priority services) would be included in the list.

Referring to 509, eNodeB 515 selects one MME ($MME_2$ 519) from the list of candidate MMEs (the list would contain only $MME_2$ 519 in the example shown in FIG. 5) and sets up a UE specific signaling with the selected MME ($MME_2$ 519) for preparing to establish the requested communications session. Were there more than one MME that can provide low priority services, such as $MME_2$ 519, however, eNodeB 515 may select an MME from the list of candidate MMEs based on, e.g., the load factors of the candidate MMEs. For example, had $MME_1$ 517 been also an MME for low priority services, the list of candidate MMEs would have included both $MME_1$ 517 and $MME_2$ 519 and one of $MME_1$ 517 and $MME_2$ 519 having a smaller work load would have been selected for the requested communication sessions. Referring to 511, the requested communications session is established between UE 513 and MME$_2$ 519 for the services desired by UE 513 once eNodeB 515 finishes setting up the UE specific signaling with MME$_2$ 519.

Figure 6:
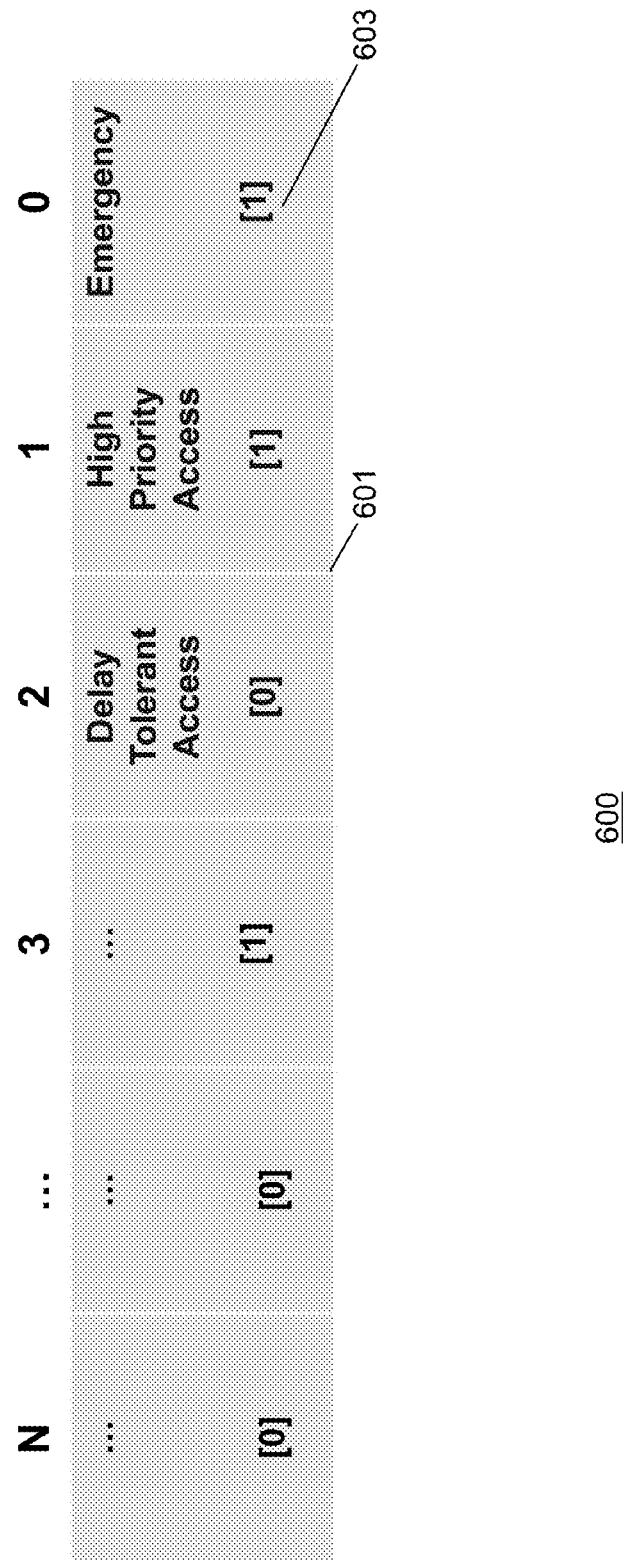
FIG. 6 shows a bitmap representing an MME Supported Features Information Element (IE) in accordance with certain embodiments.

FIG. 6 shows a bitmap 600 representing an MME Supported Features Information Element (IE) of S1AP interface in accordance with certain embodiments. Bitmap 600 includes an array of bits 601. Each bit 603 in the bit array 601 corresponds to a type of communications session that an MME supports and can be set (1) or cleared (0). The first bit of the bit array 601, for example, corresponds to an emergency session, the second bit to high priority access session, the third bit to delay tolerant access session, etc. An MME that sends, e.g., an S1 Setup Response, including the bitmap 600 can advertise to an eNodeB that it supports both emergency session and high priority access session but does not support delay tolerant access.

User Equipment and Network Device

Figure 7:
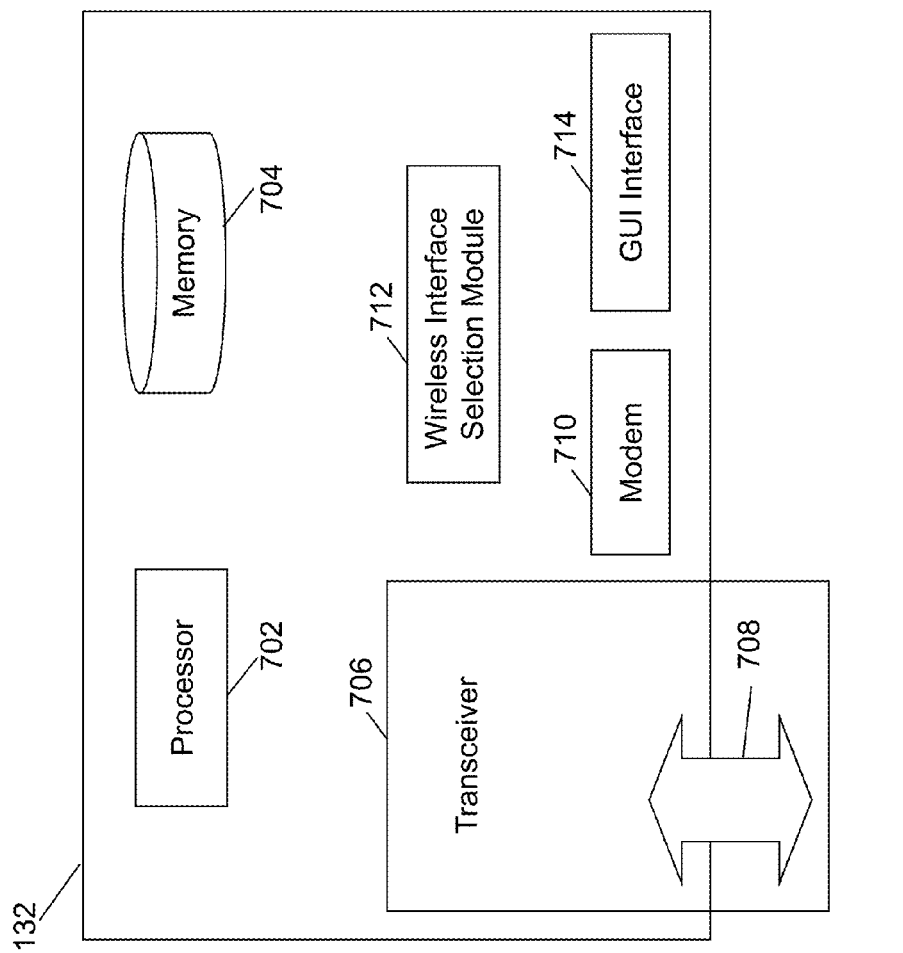
FIG. 7 shows a logical diagram of a user equipment in accordance with certain embodiments.

FIG. 7 illustrates a logical view 700 of user equipment (UE) 132 in accordance with certain embodiments. The UE 132 can include a processor 702, a memory 704, a transceiver 706 including an interface 708, a modem 710, a wireless interface selection module 712, and a GUI interface 714.

The transceiver 706 includes a transmitter and a receiver. The transmitter and the receiver can be integrated into a single chip or can be embodied in separate chips. The transceiver 706 can also include an interface 708 that provides an input and/or output mechanism to communicate with other network devices. The interface 708 can measure the wireless signal strengths of wireless interfaces such as base stations and access points. The interface 708 can be implemented in hardware to send and receive signals in a variety of mediums, such as optical, copper, and wireless, and in a number of different protocols some of which may be non-transient.

The modem 710 is configured to implement modulation and framing of signals according to one or more communication standards. The communication standards include the cellular standards defined under 3GPP.

The wireless interface selection module 712 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 712 can select the serving wireless interface by analyzing data load information associated with wireless interfaces. In certain embodiments, the wireless interface selection module 712 can be configured to attach to a wireless interface handling the least amount of data traffic and/or with more available resources. In certain embodiments, the wireless interface selection module 712 can also analyze additional information to decide to which wireless interface to connect. For example, the wireless interface selection module 712 can use one or more of the following: the load condition associated with the candidate wireless interfaces, the wireless signal strength associated with the candidate wireless interfaces, and a configuration status on the wireless interface selection module 712 indicating whether the UE 132 favors the cellular network or the WLAN.

The wireless interface selection module 712 can be implemented in software using memory 704 such as a non-transitory computer readable medium, a programmable read only memory (PROM), or flash memory. The software can run on a processor 702 that executes instructions or computer code.

The wireless interface selection module 712 may also be implemented in hardware using an application specific integrated circuit (ASIC), programmable logic array (PLA), or any other integrated circuit.

The GUI interface 714 can provide communication with an input and/or output mechanism to communicate with UE users. UE users can use input/output devices to send/receive data to/from the UE 132 over the GUI interface 714. Input/output devices can include, but are not limited to, a keyboard, a screen, a touch screen, a monitor, and a mouse. The GUI interface 714 can operate under a number of different protocols. The GUI interface 714 can be implemented in hardware to send and receive signals in a variety of mediums, such as optical, copper, and wireless.

The UE 132 described above can communicate with a plurality of radio access networks using a plurality of access technologies and with wired communication networks. The UE 132 can be a smart phone offering advanced features and capabilities, such as word processing, web browsing, gaming, e-book capabilities, an operating system, and a full keyboard. The UE 132 may run an operating system such as Symbian OS, iPhone OS, RIM's Blackberry, Windows Mobile, Linux, Palm WebOS, and Android. The screen may be a touch screen that can be used to input data to the UE 132 and the touch screen can be used instead of the full keyboard. The UE 132 may have the capability to run applications or communicate with applications that are provided by servers in the communication network. The UE 132 can receive updates and other information from these applications on the network.

The UE 132 also encompasses many other devices such as televisions (TVs), video projectors, set-top boxes or set-top units, digital video recorders (DVR), computers, netbooks, laptops, and any other audio/visual equipment that can communicate with a network. The UE 132 can also keep global positioning coordinates, profile information, or other location information in its stack or memory. The UE 132 can have a memory such as a computer readable medium, flash memory, a magnetic disk drive, an optical drive, a programmable read-only memory (PROM), and/or a read-only memory (ROM). The UE 132 can be configured with one or more processors 702 that process instructions and run software that may be stored in memory 704. The processor 702 can also communicate with the memory 704 and interfaces to communicate with other devices. The processor 702 can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 132 can also provide a variety of user interfaces (e.g., GUI Interface 714) such as a keyboard, a touch screen, a trackball, a touch pad, and/or a mouse. The UE 132 may also include speakers and a display device in some embodiments.

The interworking between a cellular network and a WLAN can be implemented, at least in part, in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. The offload gateway can be implemented as any combination of the following including an xGSN, an xGW, an xGW-SGW, and an xGW-PGW.

Figure 8:
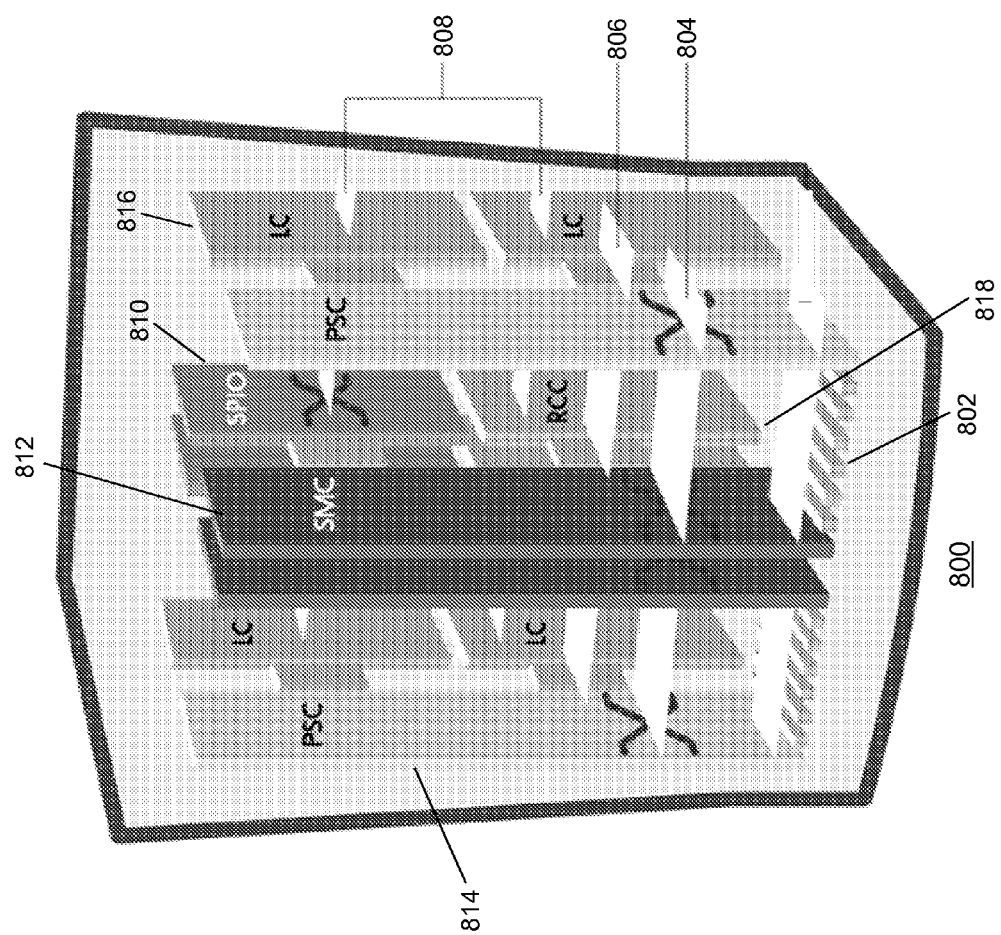
FIG. 8 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 8 illustrates the implementation of a network device 800 in accordance with some embodiments. The network device 800 includes slots 802 for loading application cards and line cards. A midplane can be used in the network device 800 to provide intra-network device communications, power connections, and transport paths between the various installed cards. The midplane can include buses such as a switch fabric 804, a control bus 806, a system management bus, a redundancy bus 808, and a time division multiplex (TDM) bus. The switch fabric 804 is an IP-based transport path for user data throughout the network device 800 implemented by establishing inter-card communications between application cards and line cards. The control bus 806 interconnects the control and management processors within the network device 800. The network device management bus provides management of system functions such as supplying power, monitoring temperatures, board status, data path errors, card resets, and other failover features. The redundancy bus 808 provides transportation of user data and redundancy links in the event of hardware failures. The TDM bus provides support for voice services on the system.

The network device 800 supports at least four types of application cards: a switch processor I/O card (SPIO) 810, a system management card (SMC) 812, a packet service card (PSC) 814, and a packet accelerator card (not shown). Other cards used in the network device 800 include line cards 816 and redundant crossbar cards (RCC) 818. The line cards 816, when loaded in the network device 800, provide input/output connectivity to the network and other devices, as well as redundancy connections. The line cards 816 include interfaces to the network through Ethernet, Fiber Optic, and/or any other communication mediums. The redundant crossbar card (RCC) 818 includes a non-blocking crossbar and connections to each of the cards in the network device 800. This allows a redundant connection to be made through the redundant crossbar card 818 from any one card to any other card in the network device 800. The SPIO card 810 serves as a controller of the network device 800 and is responsible for such things as initializing the network device 800 and loading software configurations onto other cards in the network device 800.

The system management card (SMC) 812 and switch processor card (not shown) are system control and management cards for managing and controlling other cards in the network device 800. The packet accelerator card (PAC) and packet service card (PSC) 814 provide packet processing, context processing capabilities, and forwarding capabilities among other things. The PAC and PSC 814 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device 800 such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The software in the network device 800 can be divided into a series of tasks that perform specific functions. These tasks communicate with each other as needed to share control and data information throughout the network device 800. A task is a software process that performs a specific function related to system control or session processing. Three types of tasks operate within the network device 800 in some embodiments: critical tasks, controller tasks, and manager tasks. The critical tasks control functions that relate to the ability of the network device 800 to process calls such as network device initialization, error detection, and recovery tasks. The controller tasks mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device (e.g., network device 800) include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node (e.g., user equipment 132), the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

Figure 9:
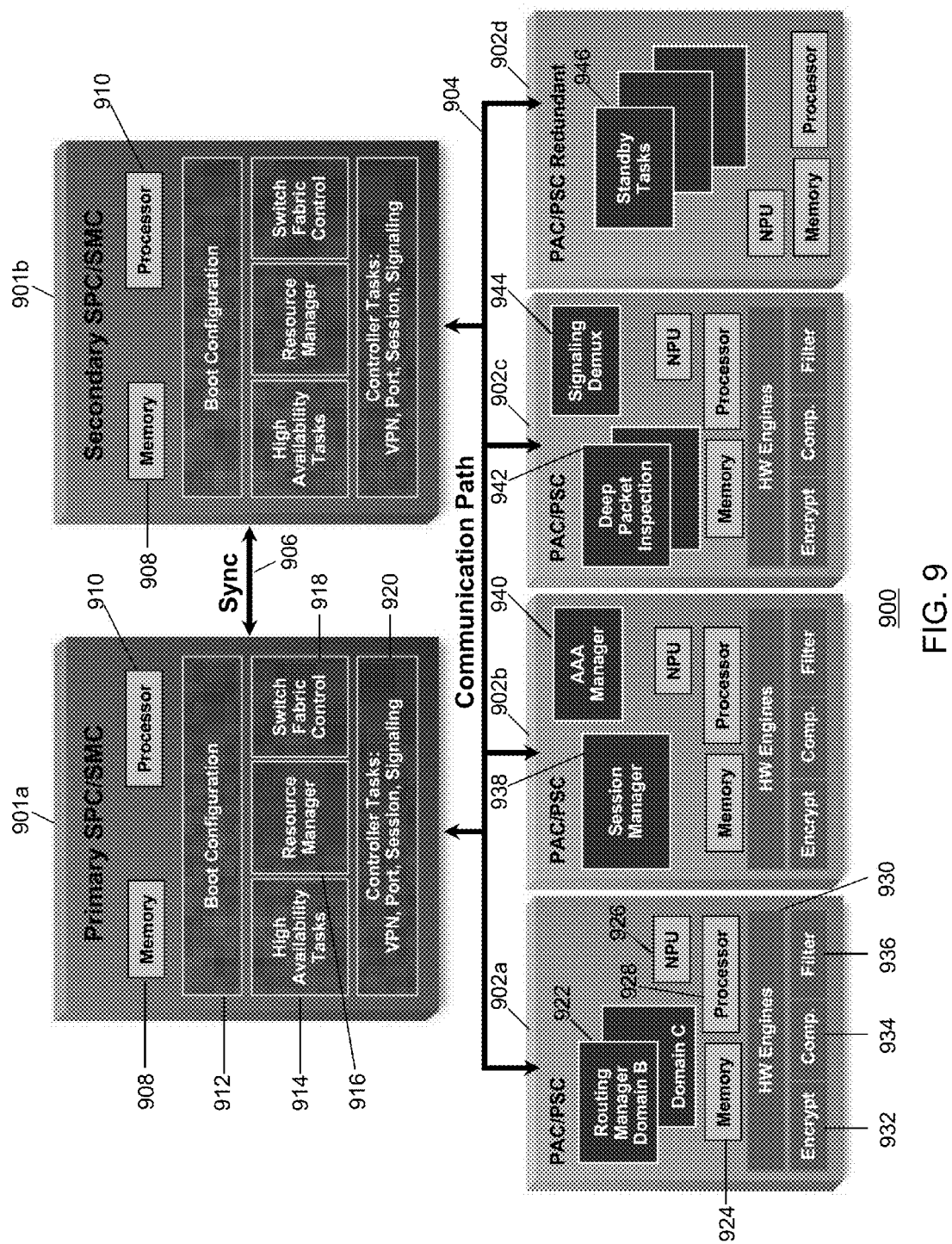
FIG. 9 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 9 illustrates a logical view 900 of the software architecture of a network device (e.g., network device 800) in accordance with certain embodiments. As shown, the software and hardware can be distributed within the network device and across different circuit boards, processors, and memory. FIG. 9 includes a primary switch processor card (SPC)/system management card (SMC) 901a, a secondary SPC/SMC 901b, PAC/PSC 902a-902d, a communication path 904, and a synchronization path 906. The primary SPC/SMC 901a and the secondary SPC/SMC 901b each includes a memory 908, a processor 910, a boot configuration 912, high availability tasks 914, resource manager 916, switch fabric control 918, and controller tasks 920.

The SPC/SMC 901 manages and controls the network device including the other cards in the network device. The SPC/SMC 901 can be configured in a primary and secondary arrangement that provides redundancy and failsafe protection. The modules or tasks running on the SPC/SMC 901 are related to network device wide control and management. The boot configuration task 912 includes information for starting up and testing the network device. The network device can also be configured to startup in different configurations and providing different implementations. These can include which functionalities and services are capable of running on the SPC/SMC 901. The high availability task 914 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 901 or a PAC/PSC 902, while some processor intensive tasks can also be performed across multiple PACs/PSCs to utilize multiple CPU resources. Distribution of these tasks is invisible to the user. The switch fabric control 918 controls the communication paths in the network device. The controller tasks module 920 can manage the tasks among the resources of the networks to provide, for example, VPN services, assign ports, and create, delete, and modify sessions for UE 132.

The PAC/PSC 902 is a high-speed processing card that is designed for packet processing and the tasks involved with providing various network functionalities on the network device. The PAC/PSC 902 include a memory 924, a network processing unit (NPU) 926, a processor 928, a hardware engine 930, an encryption component 932, a compression component 934, and a filter component 936. Hardware engines 930 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 902 is capable of supporting multiple contexts. The PAC/PSC 902 is also capable of running a variety of tasks or modules. PAC/PSC 902a provides routing managers 922 with each covering routing of a different domain. PAC/PSC 902b provides a session manager 938 and an AAA manager 940. The session manager 938 manages one or more sessions that correspond to one or more UE 132. A session allows a UE 132 to communicate with the network for voice calls and data. The AAA manager 940 manages accounting, authentication, and authorization with an AAA server in the network. PAC/PSC 902 provides a DPI task 942 and a signaling demux 944. The DPI task 942 provides inspection of packet information beyond layer 4 for use and analysis by the network device. The signaling demux 944 can provide scalability of services in combination with other modules. PAC/PSC 902d provides redundancy through standby tasks 946. Standby tasks 946 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:

1. A method comprising:
   receiving at a base transceiver station (BTS) a message from each of a plurality of mobile management entities (MMEs), wherein each of the messages includes capability information for advertising functionalities that each of the plurality of MMEs is capable of providing and wherein the advertised functionalities include at least one type of communications session that is supported by each of the plurality of MMEs, the types of communication sessions including relatively delay-tolerant sessions and relatively delay-intolerant sessions;
   receiving at the BTS a message from a user equipment (UE) to request for a communications session, wherein the request message includes session type information indicating a type of communications session requested by the UE for services and wherein at least one of the plurality of the MMEs is capable of serving the requested type of communications session;
   generating at the BTS a list of candidate mobility management entities (MMEs) that are capable of serving the requested type of communications session for the services from the plurality of MMEs by matching the session type information with the information regarding the advertised functionalities; and
   selecting at the BTS a serving mobility management entity (MME) from the list of candidate MMEs based at least in part on the information relating to the advertised functionalities, wherein the selection includes selecting based on a combination of the information relating to the advertised functionalities and on a load factor.

2. The method of claim 1, further comprising establishing the requested type of communications session between the UE and the selected serving MME.

3. The method of claim 1, wherein the message from each of the plurality of MMEs includes a message supported by S1 Application Part (S1AP) interface and the capability information includes an S1AP Information Element (IE).

4. The method of claim 3, wherein the S1AP IE includes an MME Supporting Features information element (IE).

5. The method of claim 4, wherein the MME Supporting Features IE includes a bitmap having an array of bits, wherein each bit in the bit array corresponds to a different type of communications session that can be supported by an MME.

6. The method of claim 1, wherein the session type information includes an element of Establishment Cause included in a radio resource control (RRC) Connection Request, the method further comprising deriving at the BTS the requested type of communications session from the element of Establishment Cause.

7. The method of claim 1, wherein the at least one type of communications session that is supported by each of the plurality of MMEs and the type of communications session requested by the UE include an emergency session.

8. The method of claim 1, wherein the types of communication sessions include streaming media.

9. The method of claim 1, wherein the receiving includes receiving the messages from at least one cloud-based MME and at least one carrier grade core network MME.

10. The method of claim 9, wherein the selecting includes selecting a carrier grade core network MME in response to a UE request for streaming media.

11. The method of claim 9, wherein the selecting includes selecting a cloud-based MME in response to a UE request for a delayed-tolerant session.

12. A network device comprising:
   a memory capable of storing data; and
   a processor configured for using the data such that the network device can:
      receive a message from each of a plurality of mobile management entities (MMEs), wherein each of the messages includes capability information for advertising functionalities that each of the plurality of MMEs is capable of providing and wherein the advertised functionalities include at least one type of communications session that is supported by each of the plurality of MMEs, the types of communication sessions including relatively delay-tolerant sessions and relatively delay-intolerant sessions;

receive a message from a user equipment (UE) for a communications session, wherein the request message includes session type information indicating a type of communications session requested by the UE for services and wherein at least one of the plurality of the MMEs is capable of serving the requested type of communications session;

generate a list of candidate mobility management entities (MMEs) that are capable of serving the requested type of communications session for the services from the plurality of MMEs by matching the session type information with the information regarding the advertised functionalities; and select a serving mobility management entity (MME) from the list of candidate MMEs based at least in part on the information relating to the advertised functionalities, wherein the selection includes selecting based on a combination of the information relating to the advertised functionalities and on a load factor.

13. The network device of claim 12, wherein the network device includes a base transceiver station (BTS), and the network device includes an Evolved Node B (eNodeB).

14. The network device of claim 12, wherein the processor is further configured for using the data such that the network device can establish the requested type of communications session between the UE and the selected serving MME and wherein the message from each of the plurality of MMEs includes a message supported by S1 Application Part (S1AP) interface and the capability information includes an S1AP Information Element (IE).

15. The network device of claim 14, wherein the S1AP IE includes an MME Supporting Features information element (IE).

16. The network device of claim 15, wherein the MME Supporting Features IE includes a bitmap having an array of bits, wherein each bit in the bit array corresponds to a different type of communications session that can be supported by an MME.

17. The network device of claim 12, wherein the session type information includes an element of Establishment Cause included in a radio resource control (RRC) Connection Request.

18. The network device of claim 12, wherein the types of communication sessions include streaming media.

19. The network device of claim 12, wherein the processor is configured to receive the messages from at least one cloud-based MME and at least one carrier grade core network MME.

20. The network device method of claim 19, wherein the processor is configured to select a carrier grade core network MME in response to a UE request for streaming media.

21. The network device method of claim 19, wherein process is configured to select a cloud-based MME in response to a UE request for a delayed-tolerant session.

22. A computer program product residing on a non-transitory computer-readable medium, the computer program product comprising computer executable code which, when executed by one or more processors, causes the one or more processors to perform a method comprising:

receiving at a base transceiver station (BTS) a message from each of a plurality of mobile management entities (MMEs), wherein each of the messages includes capability information for advertising functionalities that each of the plurality of MMEs is capable of providing and wherein the advertised functionalities include at least one type of communications session that is supported by each of the plurality of MMEs, the types of communication sessions including relatively delay-tolerant sessions and relatively delay-intolerant sessions;

receiving at the BTS a message from a user equipment (UE) to request for a communications session, wherein the request message includes session type information indicating a type of communications session requested by the UE for services and wherein at least one of the plurality of the MMEs is capable of serving the requested type of communications session;

generating at the BTS a list of candidate mobility management entities (MMEs) that are capable of serving the requested type of communications session for the services from the plurality of MMEs by matching the session type information with the information regarding the advertised functionalities; and selecting at the BTS a serving mobility management entity (MME) from the list of candidate MMEs based at least in part on the information relating to the advertised functionalities, wherein the selection includes selecting based on a combination of the information relating to the advertised functionalities and on a load factor.

* * * * *